United States Patent
Ben David et al.

(10) Patent No.: US 11,611,583 B2
(45) Date of Patent: Mar. 21, 2023

(54) SYSTEM AND METHOD FOR DETECTION OF MALICIOUS INTERACTIONS IN A COMPUTER NETWORK

(71) Applicant: IntSights Cyber Intelligence Ltd., Herzliya (IL)

(72) Inventors: Gal Ben David, Petah Tikva (IL); Amir Hozez, Ganei Tiqwa (IL)

(73) Assignee: IntSights Cyber Intelligence Ltd., Tel Aviv (IL)

( * ) Notice: Subject to any disclaimer, the term of this patent is extended or adjusted under 35 U.S.C. 154(b) by 0 days.

(21) Appl. No.: 16/002,065

(22) Filed: Jun. 7, 2018

(65) Prior Publication Data
US 2019/0379694 A1 Dec. 12, 2019

(51) Int. Cl.
*H04L 9/40* (2022.01)

(52) U.S. Cl.
CPC ...... *H04L 63/1491* (2013.01); *H04L 63/0263* (2013.01)

(58) Field of Classification Search
CPC ............. H04L 63/1491; H04L 63/1441; H04L 63/1425; H04L 63/145; H04L 63/0263; H04L 63/1466
See application file for complete search history.

(56) References Cited

U.S. PATENT DOCUMENTS

| | | | | |
|---|---|---|---|---|
| 7,636,944 B2* | 12/2009 | Raikar | ................ | H04L 51/212 726/1 |
| 7,917,593 B1* | 3/2011 | Lee | .................... | G06Q 10/107 709/206 |
| 8,181,250 B2* | 5/2012 | Rafalovich | ........ | H04L 43/0876 726/13 |
| 8,990,944 B1* | 3/2015 | Singh | ..................... | G06F 21/53 726/24 |
| 9,009,829 B2* | 4/2015 | Stolfo | .................. | G06F 21/554 726/23 |
| 9,361,457 B1* | 6/2016 | Ramalingam | .......... | G06F 21/56 |
| 9,462,013 B1* | 10/2016 | Boss | .................. | H04L 63/1416 |
| 9,609,019 B2* | 3/2017 | Vissamsetty | ....... | H04L 63/1491 |
| 9,882,929 B1* | 1/2018 | Ettema | ............... | H04L 63/1491 |
| 9,942,270 B2* | 4/2018 | Vissamsetty | ....... | H04L 63/1491 |
| 9,954,893 B1* | 4/2018 | Zhao | .................. | H04L 63/1416 |

(Continued)

OTHER PUBLICATIONS

Catakoglu, Onur, Marco Balduzzi, and Davide Balzarotti. "Attacks landscape in the darkside of the web." Proceedings of the Symposium on Applied Computing. 2017. (Year: 2017).*

(Continued)

*Primary Examiner* — Kari L Schmidt
(74) *Attorney, Agent, or Firm* — Wolf, Greenfield & Sacks, P.C.

(57) ABSTRACT

System and method of detecting malicious interactions in a computer network, the method including generating, by a processor, at least one decoy segment, broadcasting, by the processor, the generated at least one decoy segment in a public database, monitoring, by the processor, communication within the computer network to identify interactions associated with the generated at least one decoy segment, determining, by the processor, at least one indicator of compromise (IOC) for the identified interactions, and blocking communication between the computer network and any computer associated with the determined at least one IOC.

19 Claims, 3 Drawing Sheets

(56) References Cited

U.S. PATENT DOCUMENTS

| | | | | |
|---|---|---|---|---|
| 9,971,891 B2* | 5/2018 | Bowen | | G06F 21/566 |
| 9,985,982 B1* | 5/2018 | Bartos | | H04L 63/1425 |
| 9,990,507 B2* | 6/2018 | Ramalingam | | G06F 21/62 |
| 10,009,370 B1* | 6/2018 | Douglas | | H04L 63/145 |
| 10,015,198 B2* | 7/2018 | Ettema | | H04L 67/1095 |
| 10,326,796 B1* | 6/2019 | Varadarajan | | H04L 63/1491 |
| 10,521,584 B1* | 12/2019 | Sharifi Mehr | | H04L 63/1433 |
| 10,530,810 B2* | 1/2020 | Ettema | | H04L 63/1491 |
| 2005/0257261 A1* | 11/2005 | Shraim | | H04L 51/12 |
| | | | | 726/22 |
| 2006/0029087 A1* | 2/2006 | Ooi | | H04L 12/6418 |
| | | | | 370/402 |
| 2006/0036748 A1* | 2/2006 | Nusbaum | | H04L 67/306 |
| | | | | 709/228 |
| 2007/0101430 A1* | 5/2007 | Raikar | | H04L 63/1416 |
| | | | | 726/24 |
| 2007/0299777 A1* | 12/2007 | Shraim | | G06Q 10/107 |
| | | | | 705/51 |
| 2008/0034424 A1* | 2/2008 | Overcash | | H04L 63/1416 |
| | | | | 726/22 |
| 2010/0077483 A1* | 3/2010 | Stolfo | | G06F 21/554 |
| | | | | 726/24 |
| 2013/0061307 A1* | 3/2013 | Livne | | H04W 12/06 |
| | | | | 726/7 |
| 2014/0047043 A1* | 2/2014 | Esfahani | | H04L 51/28 |
| | | | | 709/206 |
| 2015/0089354 A1* | 3/2015 | Abrahami | | G06F 16/958 |
| | | | | 715/235 |
| 2015/0135316 A1* | 5/2015 | Tock | | G06F 21/566 |
| | | | | 726/23 |
| 2015/0135317 A1* | 5/2015 | Tock | | G06F 21/56 |
| | | | | 726/23 |
| 2016/0277444 A1* | 9/2016 | Keromytis | | H04L 63/145 |
| 2017/0019425 A1* | 1/2017 | Ettema | | G06F 9/45533 |
| 2017/0026387 A1* | 1/2017 | Vissamsetty | | H04L 63/1408 |
| 2017/0134423 A1* | 5/2017 | Sysman | | G06F 21/554 |
| 2017/0171244 A1* | 6/2017 | Vissamsetty | | H04L 63/1491 |
| 2017/0187741 A1* | 6/2017 | Desch | | H04L 63/102 |
| 2017/0223034 A1* | 8/2017 | Singh | | H04L 43/062 |
| 2017/0223037 A1* | 8/2017 | Singh | | H04L 43/062 |
| 2017/0223046 A1* | 8/2017 | Singh | | H04L 63/1491 |
| 2017/0233037 A1 | 8/2017 | Abhishek et al. | | |
| 2017/0289191 A1* | 10/2017 | Thioux | | H04L 63/1441 |
| 2018/0046796 A1* | 2/2018 | Wright | | G06F 21/45 |
| 2018/0077181 A1* | 3/2018 | Chen | | H04L 63/1425 |
| 2018/0191747 A1* | 7/2018 | Nachenberg | | H04L 63/1408 |
| 2018/0309787 A1* | 10/2018 | Evron | | G06F 21/121 |
| 2019/0190952 A1* | 6/2019 | Cherry | | H04L 63/1491 |
| 2019/0253453 A1* | 8/2019 | Vissamsetty | | H04L 63/20 |

OTHER PUBLICATIONS

S. Morishita et al., "Detect Me If You . . . Oh Wait. An Internet-Wide View of Self-Revealing Honeypots," 2019 IFIP/IEEE Symposium on Integrated Network and Service Management (IM), 2019, pp. 134-143. (Year: 2019).*

Herath, H. M. N. B. Web information extraction system to sense information leakage. Diss. University of Moratuwa Sri Lanka, 2017. (Year: 2017).*

Jeremiah Onaolapo, Enrico Mariconti, and Gianluca Stringhini. 2016. What Happens After You Are Pwnd: Understanding the Use of Leaked Webmail Credentials in the Wild. In Proceedings of the 2016 Internet Measurement Conference (IMC '16). Association for Computing Machinery, New York, NY, USA, 65-79. (Year: 2016).*

European Search Report of Application No. EP 19178240 dated Oct. 22, 2019.

Bowen et al., "Baiting Inside Attackers Using Decoy Documents", In: Chen Y., Dimitriou T.D., Zhou J. (eds) Security and Privacy in Communication Networks. SecureComm 2009. Lecture Notes of the Institute for Computer Sciences, Social Informatics and Telecommunications Engineering, vol. 19. Springer, Berlin, Heidelberg, URL: https://www.cs.columbia.edu/~angelos/Papers/2009/DecoyDocumentsSECCOM09.pdf.

Rene et al., "Malicious Code Intrusion Detection using Machine Learning And Indicators of Compromise", International Journal of Computer Science and Information Security, vol. 15, No. 9, Sep. 2017, pp. 160-171, ResearchGate.

* cited by examiner

SYSTEM AND METHOD FOR DETECTION OF MALICIOUS INTERACTIONS IN A COMPUTER NETWORK

FIELD OF THE INVENTION

The present invention relates to computer networks. More particularly, the present invention relates to systems and methods for detection of malicious interactions in computer networks.

BACKGROUND OF THE INVENTION

Computer networks are constantly vulnerable to malicious attacks by hackers. Some hackers may use social engineering tools or other methods in order to gather data (e.g., email addresses, passwords, etc.) about the target computer networks. In order to prevent malicious attacks by hackers, multiple indicators of compromise (IOCs), for instance virus signatures, URLs and IP addresses, may be collected for previously recorded attacks. Generally, an IOC is an attribute observed in a computer network that may indicate possible future computer intrusions. However, currently known IOCs do not cover all possible attacks.

While various cyber security applications are available, for instance antivirus software and firewalls, these solutions cannot prevent attacks where the attacker is in possession of private information of the computer network. For instance, a user in an organization with a private computer network posts a blog in an external website using the same credentials as used in an account of the computer network, such that attackers may steal these credentials and attempt to attack the organization with the stolen data.

SUMMARY OF THE INVENTION

There is thus provided, in accordance with some embodiments of the invention, a method of detecting malicious interactions in a computer network, the method including: generating, by a processor, at least one decoy segment, broadcasting, by the processor, the generated at least one decoy segment in a public database, monitoring, by the processor, communication within the computer network to identify interactions associated with the generated at least one decoy segment, determining, by the processor, at least one indicator of compromise (IOC) for the identified interactions, and blocking communication between the computer network and any computer associated with the determined at least one IOC.

In some embodiments, the processor may be external to the computer network. In some embodiments, an IOC database of a firewall service of the computer network may be updated with newly identified IOCs, wherein the communication is blocked by the firewall service. In some embodiments, non-malicious registers may be filtered out from the determined at least one IOC based on predetermined whitelists. In some embodiments, the at least one decoy segment may include information associated with the computer network.

In some embodiments, the at least one decoy segment may include at least one of: email address, user name and password. In some embodiments, at least one decoy information may be generated within an email message, wherein the generated at least one decoy segment comprises at least one email address associated with the generated at least one decoy information. In some embodiments, the at least one decoy segment may include an email address that corresponds to at least one existing email service.

In some embodiments, the at least one decoy segment may include an email address that comprises contextual similarity to at least one existing email service. In some embodiments, the at least one decoy segment may include an email address that corresponds to at least one disposable email service. In some embodiments, the at least one decoy segment may include at least one decoy vulnerability of the computer network, and wherein an attempt to exploit the at least one decoy vulnerability may be identified as an interaction associated the generated at least one decoy segment. In some embodiments, a virtual computer network corresponding to the computer network may be created, wherein the at least one decoy segment comprises information associated with the virtual computer network, and the virtual computer network may be monitored to identify interactions associated with the generated at least one decoy segment.

There is thus provided, in accordance with some embodiments of the invention, a system for detection of malicious interactions in a computer network with at least one blocking service, the system including: a processor, in communication with the computer network, and a first database, coupled to the processor and comprising indicator of compromise (IOC) registers, wherein the processor is configured to: generate at least one decoy segment, broadcast the generated at least one decoy segment in a public database, monitor the computer network to identify interactions associated with the generated at least one decoy segment, determine at least one IOC for the identified interactions, store the determined IOC in the first database, and share the first database with the at least one blocking service in order to block communication between the computer network and any computer associated with the determined at least one IOC.

In some embodiments, the processor may be embedded within the computer network. In some embodiments, a second database may be coupled to the processor and including a list of public databases for broadcasting of the generated decoy segments.

There is thus provided, in accordance with some embodiments of the invention, a method of detecting attacks on a target computer, the method including: publishing, by a processor, at least one decoy data item in at least one publicly accessible database, monitoring, by the processor, communication to the target computer to identify interactions associated with the at least one decoy data item, determining, by the processor, at least one attribute for the identified interactions, and blocking communication between the target computer and any external computer, the communication associated with the determined at least one attribute.

In some embodiments, a database of a blocking service of the target computer may be updated with newly identified attributes, wherein the communication is blocked by the blocking service. In some embodiments, the at least one decoy data item may include information associated with the target computer. In some embodiments, wherein the at least one decoy data item may include at least one decoy vulnerability of the target computer, and wherein an attempt to exploit the at least one decoy vulnerability may be identified as an interaction associated with the generated at least one decoy data item. In some embodiments, a virtual computer associated with the target computer may be created, wherein the at least one decoy data item comprises information corresponding to the virtual computer, and the virtual computer may be monitored to identify interactions associated with the generated at least one decoy data item.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

According to some embodiments, a system and methods are provided for detection of malicious interactions in computer networks using decoy segments. Malicious interactions may include any interaction between a computer and/or server of the computer network and a source external to the computer network (e.g., computer of a hacker) that is intended to harm the computer network or a user thereof, for example malicious interactions may include email communication, database login, or any other interaction where data is received at the computer network from an external source to carry out an attack.

In some embodiments, a decoy data item or segment may be at least partially randomly generated by a dedicated decoy algorithm, and the decoy segment to be published in a public database (e.g., published as a segment of a list in online forums) as a bait (or honeypot) for hackers that may be malicious to users. Once an interaction (e.g., email message from an external source) within the computer network is registered with data associated with and/or corresponding to the generated decoy segment, that interaction may be blocked and all future interactions origination from the same sender may be blocked as well, for instance based on a particular IP address range. In some embodiments, publishing specific false (or bait) data to be stolen by hackers may allow determination that a user is the target of a malicious attack if the hacker uses the specific false data for the attack, and thereby prevent attacks on specific target users and/or by specific hackers which cannot be identified by other security services.

Figure 1:
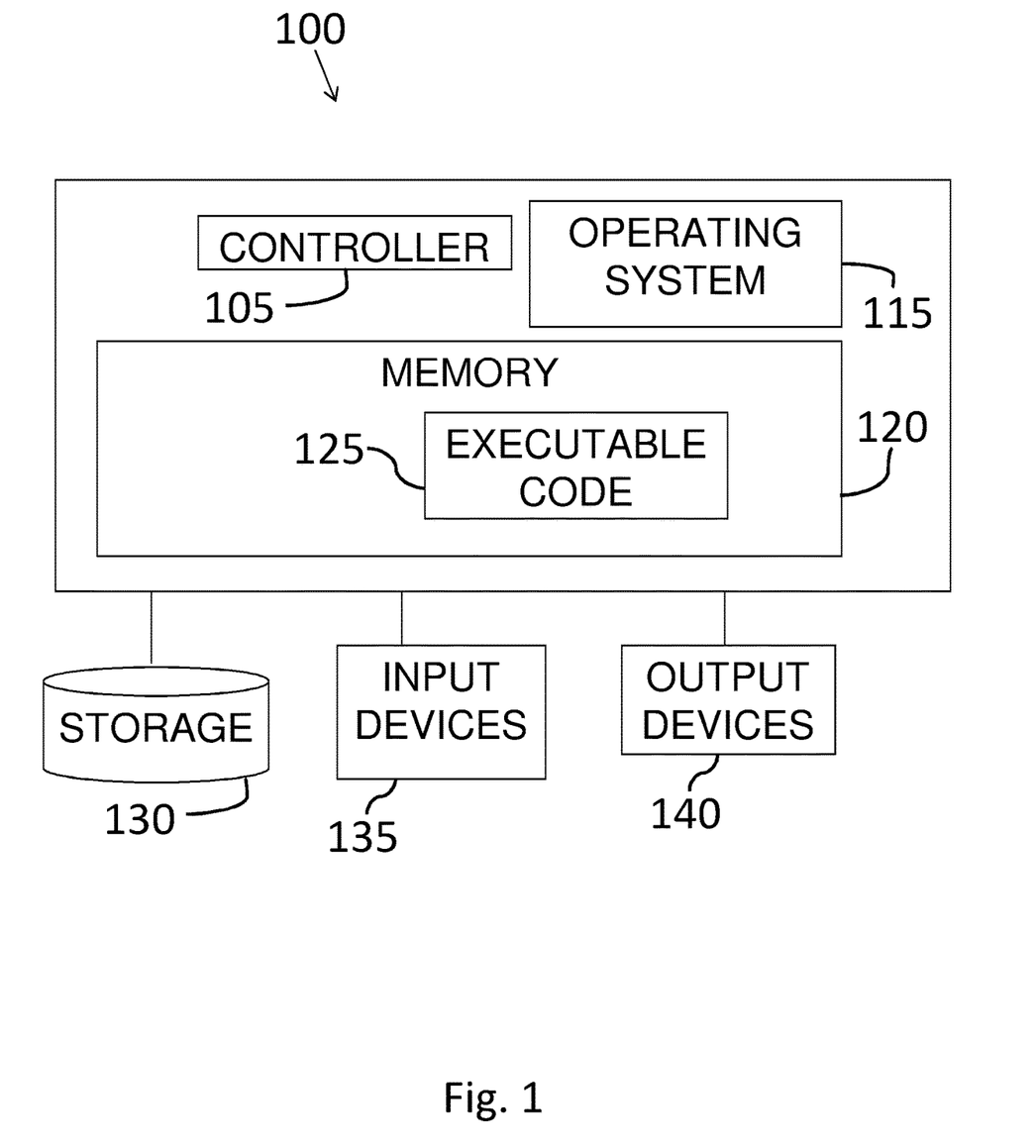
FIG. 1 shows a block diagram of an exemplary computing device, according to some embodiments of the invention.

Reference is made to FIG. 1, showing a block diagram of an exemplary computing device, according to some embodiments of the present invention. Computing device 100 may include a controller 105 that may be, for example, a central processing unit processor (CPU), a chip or any suitable computing or computational device, an operating system 115, a memory 120, a storage 130, input devices 135 and output devices 140. Controller 105 may be configured to carry out methods as disclosed herein by for example executing code or software.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application for monitoring interactions in computer systems. Where applicable, executable code 125 may carry out operations described herein in real-time. Computing device 100 and executable code 125 may be configured to update, process and/or act upon information at the same rate the information, or a relevant event, are received. In some embodiments, more than one computing device 100 may be used. For example, a plurality of computing devices that include components similar to those included in computing device 100 may be connected to a network and used as a system. For example, managing power consumption data may be performed in real time by executable code 125 when executed on one or more computing devices such computing device 100.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a modem, printer or facsimile machine, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor to carry out methods disclosed herein. For example, some embodiments of the invention may include a storage medium such as memory 120, computer-executable instructions such as executable code 125 and a controller such as controller 105.

A computer or processor non-transitory storage medium, may include for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 2:
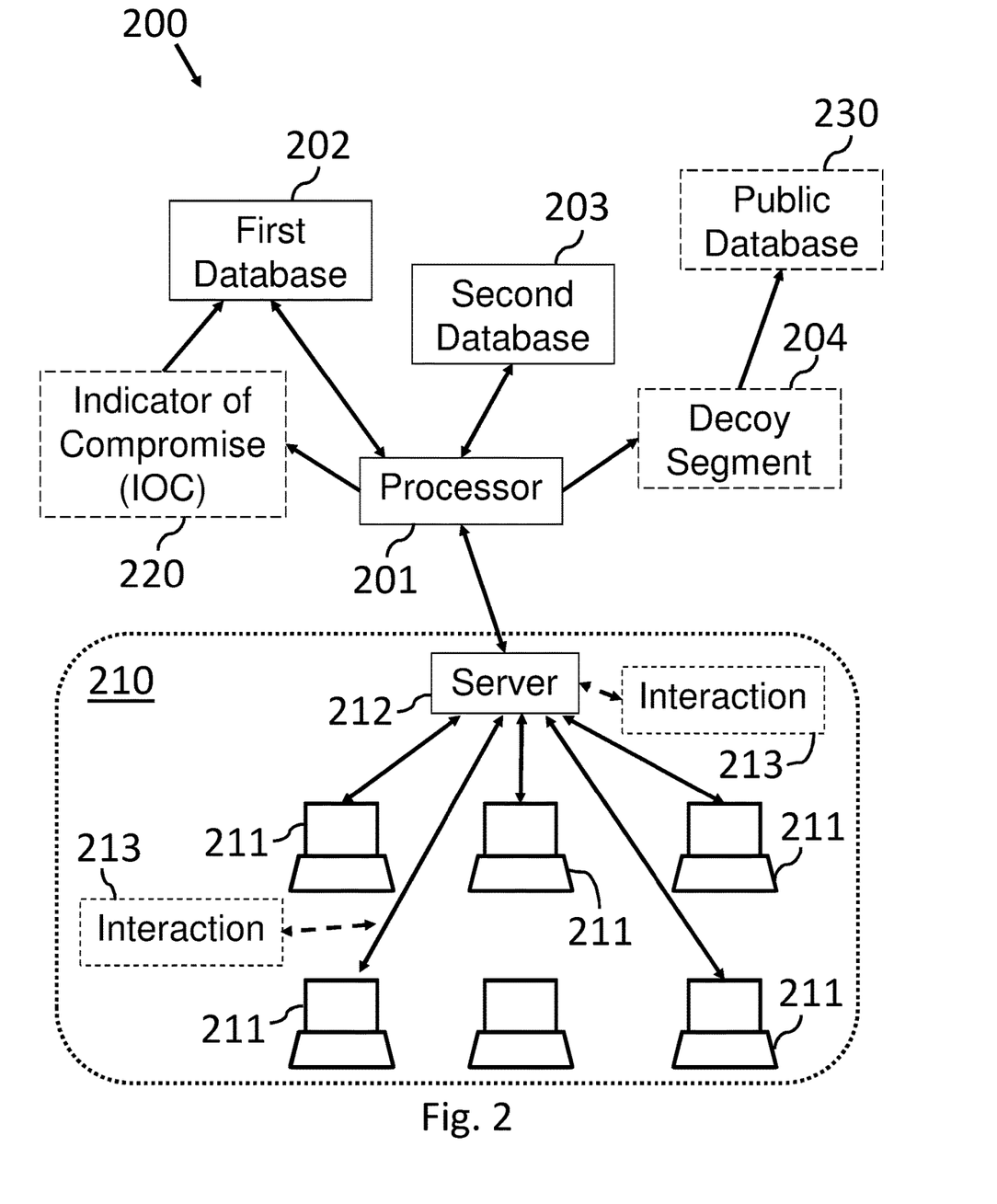
FIG. 2 schematically illustrates a system for detection of malicious interactions in a computer network, according to some embodiments of the invention.

Reference is now made to FIG. 2, which schematically illustrates a system 200 for detection of malicious interactions in a computer network 210, according to some embodiments. The computer network 210 may include at least one computing machine 211 (e.g., similarly to computing device 100 shown in FIG. 1) in communication with at least one server 212. In some embodiments, the direction of arrows in FIG. 2 may indicate the direction of information flow. In some embodiments, hardware elements of system 200 are indicated with a solid line in FIG. 2.

According to some embodiments, the system 200 may include at least one processor 201 (e.g., similarly to controller 105 shown in FIG. 1) in communication with the computer network 210, for instance via the server 212, and configured to monitor the computer network 210 in order to identify interactions associated with predetermined attributes, as further described hereinafter. Identification of such predetermined attributes may correspond to detection of malicious interactions in computer network 210. In some embodiments, processor 201 may be embedded within the computer network 210.

In some embodiments, processor 201 may be operably coupled to a first database 202 including attribute or indicator of compromise (IOC) 220 registers. The first database 202 may be updated upon determination of new IOCs 220 (by processor 201 and/or by external sources), for instance in order to block future interactions including attributes of the IOC 220. In some embodiments, a new IOC 220 may be determined upon identification of an interaction 213 that is associated with a malicious source, for example identify a hacker trying to login into a database of computer network 210 and create new IOC 220 with attribute of the attacker. In some embodiments, the processor 201 may also be coupled to a second database 203 including a list of public databases, for instance public databases where hackers typically retrieve data to be used in their attacks.

According to some embodiments, processor 201 may generate (e.g., randomly) at least one decoy data item or segment 204 by a dedicated decoy algorithm. The at least one decoy segment 204 may be broadcasted in a public database 230. For example, a decoy segment 204 (e.g., a decoy list of email addresses) may be posted in at least one online paste-bin or text storage sites as public database 230, where users usually share text (e.g., source code). Paste sites are mainly used by programmers to store pieces of sources code or configuration information, and these services are favored by hackers due to the ease of anonymously sharing information so typically they are frequently the first place a breach appears.

In some embodiments, at least one decoy segment 204 may be generated according to the dedicated decoy algorithm as decoy email addresses and/or decoy server vulnerability decoys. For example, disposable email services (e.g., 'mailinator') may be utilized to allow creation of "disposable" (for one-time use) email addresses to be later monitored to detect corresponding interactions. In another example, decoy email addresses may be generated on commonly used email services (e.g., such as 'Gmail', 'Outlook', 'Yahoo', etc.) as such email addresses may be considered as more reliable and convincing to be later monitored to detect corresponding interactions. In yet another example, decoy email addresses may be generated on decoy email domains, that may require registration of dedicated domains that resemble (e.g., resemble phonetically) internal domains in use by a specific organization (e.g., by 'Amazon') to be later monitored to detect corresponding interactions. Once created, such decoy email addresses may be published in a list along with other email addresses, for instance in order to appear as a legitimate non-suspicious list. In a further example, domains that resemble internal domains in use by specific organizations may be registered for creation of decoy web applications for publication of decoy vulnerabilities of these applications (to lure hackers targeting these organizations), to be monitored in order to detect corresponding interactions. The publication of the decoy vulnerabilities may be carried out such that these vulnerabilities be unusable for automated tools (e.g., publishing in an un-browsable manner to avoid automatic web crawlers or official domains of the organization) while being usable, or directed to actual attackers (e.g., advanced persistent threat (APT) attacks) targeting these organizations.

In some embodiments, IOCs 220 may be automatically created corresponding to decoy email addresses 204 with monitoring of received email messages such that each email that is classified as potentially threatening, for instance interaction (by email) due to the intentional publication of the decoy and not regular automatic spam message, may result in marking the sender email address as a new IOC 220. In some embodiments, IOCs 220 may be automatically created corresponding to decoy vulnerabilities by creating decoy platforms that resemble internal server of the target computer network, to be monitored in order to gather all available details on anyone attacking them and each such indicator (e.g., IP addresses and/or browser user agents) may be registered as a new IOC 220. In some embodiments, hashes used by the attacker may be identified as a new IOC 220.

In some embodiments, processor 201 may generate at least one dedicated decoy segment 204 for computer network 210 of a particular organization by initially scraping and/or harvesting information from paste sites. For example, processor 201 coupled to computer network 210 of 'Bank of America' may execute the decoy algorithm to harvest paste sites (e.g., from the list of public databases 230 in second database 203) in order to gather data relating to 'Bank of America', for instance a paste site publishing email addresses of employees of large banks. The processor 201 may generate at least one decoy segment 204 that corresponds to the gathered data, for instance modify an existing published list with added decoy data, such that the modified data may be published in order to attract hackers to the generated honeypot.

In some embodiments, the at least one decoy segment 204 may include an email address that corresponds to at least one disposable and/or pre-existing email service, for example generating a decoy email account for an existing email service of a specific organization. In some embodiments, the at least one decoy segment 204 may include an email address with contextual similarity to at least one existing email service, for example changing a character in the email address. In some embodiments, the at least one decoy segment may include an email address that corresponds to at least one disposable email service, for example a disposable email service created to identify a single IOC and/or hacker that may be deleted upon such identification and a new disposable email service (with corresponding decoy segments) may be created.

In some embodiments, processor 201 may include false and/or bait data (e.g., false usernames, passwords, etc.) corresponding to computer network 210 in such honeypots to be published and/or broadcasted in public databases 230 (e.g., in paste sites). Thus, hackers that gather data from the public databases 230 where the at least one decoy segment 204 is published may use the dedicated decoy data in future malicious attacks against the computer network 210. For example, processor 201 generate and broadcast a decoy email address in a paste site such that any hacker attempting to interact with that decoy email address may be automatically blocked by the system 200.

According to some embodiments, processor 201 may monitor communication within the computer network 210 to identify at least one interaction 213 including the generated at least one decoy segment 204. In some embodiments, the at least one decoy segment 204 may include at least one decoy vulnerability of the computer network 210, such that an attempt to exploit the at least one decoy vulnerability may be identified (e.g., by processor 201) as an interaction 213 including and/or associated with the generated at least one decoy segment 204. For example, identify that a generated decoy email address receives email addresses, or identify that a generated decoy vulnerability (e.g., decoy injection or decoy cross-site scripting code) is entered at a dedicated decoy web page.

In some embodiments, detection of interactions corresponding to a generated decoy vulnerability may include publishing (e.g., in a paste-bin) that a dedicated uniform resource locator (URL) address runs a vulnerable web service, and/or a vulnerable version of a well-known web service (for example an outdated version of the content management framework, such as 'Drupal'). Instead of deploying the actual vulnerable version of that web service on that URL, a safe version may be deployed that actually monitors who tries to penetrate it using the published vulnerability in order to determine attacker details for IOCs.

In some embodiments, processor 201 may generate at least one decoy segment 204 as a content item within a legitimate item of computer network 210, for instance generation of false data within an email message stored in a legitimate email account within computer network 210 such that a hacker attacking computer network 210 and going through email messages stored in that account may be exposed to the decoy data. For example, in order to attract potential hackers, an email account of a high-ranking official may be created appearing as a legitimate account with multiple legitimate messages, such that a hacker gaining access to that account (e.g., using legitimate password intentionally published in a paste site) may be unsuspectedly exposed to the decoy data. In some embodiments, decoy data relating to a specific user may be published (e.g., in a social network web site) in order to prevent dozing attacks in the future, for instance registering all users accessing that decoy data.

In some embodiments, processor 201 may accordingly determine at least one IOC 220 associated with the generated decoy segments 204 for the identified interactions 213. For instance, the processor 201 may determine at least one attribute or IOC 220 corresponding to identified interactions 213 with the server 212, for example identify a new email message received at a decoy email address hosted by server 212 or identify an interaction targeting a particular target computer or computing machine 211. Each determined IOC 220 may be stored at the first database 202 to be later applied on security services of the computer network 210, for instance update the firewall of computer network 210 with the new IOC 220. In some embodiments, communication between the computer network 210 and any external computer including the determined at least one IOC 220 may be blocked (e.g., by processor 201).

For example, processor 201 may generate a set of decoy email accounts (e.g., hosted by the server 212) and corresponding passwords as decoy segment 204 and publish in at least one public database 230 from the second database 203. After the decoy segment 204 is broadcasted, processor 201 may monitor all communication to server 212 until at least one interaction 213 with the server 212 using data from decoy segment 204 is identified. Since the origin of such interaction 213 may be a malicious hacker, processor 201 may register data (and/or metadata) relating to the origin of the interaction 213 in order to determine at least one corresponding IOC 220. The data relating to the origin of the interaction as IOC 220 may be at least one of origin IP/MAC address (and/or range of addresses), time and/or date of interaction, target of interaction, virus signatures, hashes (e.g., MD5) of malware files, automatic script activated interaction (e.g., bots) or human operators, etc.

In some embodiments, the first database 202 may be updated (e.g., daily) with the newly gathered IOC 220 such that the list of corresponding hackers corresponding to these IOCs 220 may be accordingly updated as well. In some embodiments, processor 201 may filter out IOCs 220 that relate to previously registered IOCs 220 and/or filter out IOCs 220 that cannot be used to block hackers in the future (e.g., an interaction 213 without a traceable IP address) such that the first database 202 may only be updated with IOCs 220 that allow blocking of potential attacks in the future. In some embodiments, a newly added IOC 220 may be incorporated in security services and/or blocking services of computer network 210 (e.g., firewalls, proxies, etc.) in order to block future attacks.

In some embodiments, processor 201 may filter out non-malicious registers from the determined at least one IOC 220 based on predetermined whitelists, for instance whitelists for previously determined legitimate sources. For example, such whitelists may include a list of well-known and/or most visited domains that are known to host legitimate content and not malware (for instance popular domains such as "facebook.com").

In some embodiments, an IOC database of a firewall service of the computer network 210 may be updated with the determined at least one IOC 220, such that the communication may be blocked by the firewall service based on the determined IOCs 220.

Figure 3:
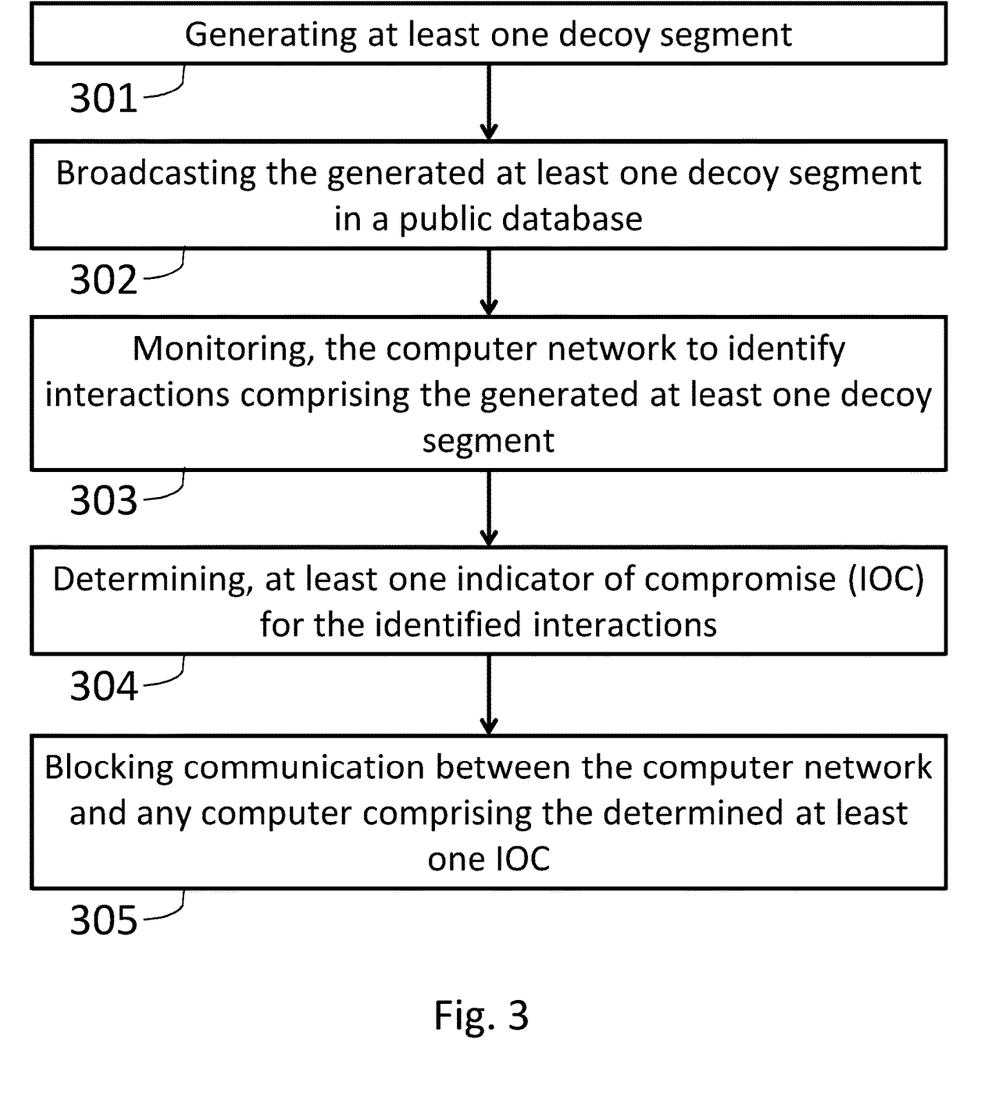
FIG. 3 shows a flowchart of a method of detecting malicious interactions in a computer network, according to some embodiments of the invention.

Reference is now made to FIG. 3, which shows a flowchart for a method of detecting malicious interactions in a computer network, according to some embodiments. The processor 201 may generate 301 at least one decoy segment 204 and broadcast 302 the generated at least one decoy segment 204 in a public database 230.

In some embodiments, processor 201 may monitor 303 the computer network 210 to identify interactions 213 including the generated at least one decoy segment 204, and to determine 304 at least one IOC 220 for the identified interactions 213. In some embodiments, communication between the computer network 210 and any (external) computer including the determined at least one IOC 220 may be blocked 305.

According to some embodiments, a virtual computer network may be created (e.g., by processor 201) to correspond to the computer network 210 such that generated decoy segments 204 may include information associated with the virtual computer network. In some embodiments, communication within the virtual computer network may be monitored (e.g., by processor 201) to identify interactions 213 with the generated decoy segment 204.

It should be noted that the computer systems and methods described herein may improve computer technology by preventing and/or reducing hacking attempts using the detected IOCs, whereby it is otherwise not possible to link specific attacks to hackers and usage of the abovementioned decoy segments may allow such correlation.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A method for detecting malicious interactions in a computer network, the method comprising:
   generating, by a processor, at least one decoy segment including a one-time use email address to be monitored to detect malicious interactions;
   broadcasting, by the processor, the generated at least one decoy segment in a public database;
   monitoring, by the processor, communication within the computer network to identify at least one interaction associated with the generated at least one decoy segment;
   determining, by the processor, at least one indicator of compromise for the identified at least one interaction;
   blocking communication, using at least one blocking service of the computer network, between the computer network and any computer associated with the determined at least one indicator of compromise; and
   updating a database of the at least one blocking service with the identified at least one indicator of compromise,
   wherein the one-time use email address corresponds to at least one disposable email service, the disposable email service configured to be deleted after identifying the at least one indicator of compromise.

2. The method of claim 1, wherein the processor is external to the computer network.

3. The method of claim 1, wherein the at least one blocking service comprises a firewall service of the computer network.

4. The method of claim 1, further comprising filtering out the at least one indicator of compromise based on predetermined whitelists.

5. The method of claim 1, wherein the at least one decoy segment further comprises a decoy segment that has information associated with the computer network.

6. The method of claim 1, wherein the at least one decoy segment further comprises a decoy segment comprising at least one of: decoy injection and decoy cross-site scripting code.

7. The method of claim 1, wherein the at least one indicator of compromise comprises a virus signature, a uniform resource locator (URL), and/or an IP address.

8. The method of claim 1, further comprising deleting the disposable email service after identifying the at least one indicator of compromise.

9. The method of claim 1, wherein the at least one blocking service comprises a proxy of the computer network.

10. A system for detection of malicious interactions in a computer network with at least one blocking service, the system comprising:

a hardware processor, in communication with the computer network; and a first database, coupled to the hardware processor and comprising indicator of compromise registers, wherein the hardware processor is configured to:
- create a virtual computer network corresponding to the computer network;
- generate at least one decoy segment including information associated with the virtual computer network;
- broadcast the generated at least one decoy segment in a public database;
- monitor communication within the virtual computer network to identify at least one interaction associated with the generated at least one decoy segment;
- determine at least one indicator of compromise for the identified at least one interaction;
- store the determined indicator of compromise in the first database; and
- share the first database with the at least one blocking service in order to block communication between the computer network and any computer associated with the determined at least one indicator of compromise.

11. The system of claim 10, wherein the hardware processor is embedded within the computer network.

12. The system of claim 10, further comprising a second database coupled to the hardware processor and comprising a list of public databases for broadcasting of the generated at least one decoy segment.

13. The system of claim 10, wherein the at least one indicator of compromise comprises a virus signature, a uniform resource locator (URL), and/or an IP address.

14. The system of claim 10, wherein the at least one blocking service comprises a firewall service of the computer network.

15. The system of claim 10, wherein the at least one blocking service comprises a proxy of the computer network.

16. A non-transitory storage medium storing instructions that, when executed by a processor, cause the processor to perform a method for detecting malicious interactions in a computer network, the method comprising:
- generating, using information scraped and/or harvested from paste sites, at least one decoy segment for detecting malicious interactions in the computer network;
- broadcasting the generated at least one decoy segment in a public database;
- modifying a list from the public database with the decoy segment generated using the information scraped and/or harvested from paste sites;
- monitoring communication within the computer network to identify at least one interaction associated with the generated at least one decoy segment;
- determining at least one indicator of compromise for the identified at least one interaction;
- blocking communication, using at least one blocking service of the computer network, between the computer network and any computer associated with the determined at least one indicator of compromise; and
- updating a database of the at least one blocking service with the identified at least one indicator of compromise.

17. The non-transitory storage medium of claim 16, wherein the at least one indicator of compromise comprises a virus signature, a uniform resource locator (URL), and/or an IP address.

18. The non-transitory storage medium of claim 16, wherein the at least one blocking service comprises a firewall service of the computer network.

19. The non-transitory storage medium of claim 16, wherein the at least one blocking service comprises a proxy of the computer network.

* * * * *